(12) United States Patent
Maung et al.

(10) Patent No.: US 10,159,941 B2
(45) Date of Patent: Dec. 25, 2018

(54) MEMBRANE SENSOR AND METHOD OF DETECTING FOULING IN A FLUID

(75) Inventors: Nyunt Wai Maung, Singapore (SG); Ee Kwong Tan, Singapore (SG); Fook-Sin Wong, Singapore (SG); Adrian Yeo, Singapore (SG); W. B. Krantz, Singapore (SG); Anthony Gordon Fane, Singapore (SG); Siang Tze Victor Sim, Singapore (SG)

(73) Assignee: Nanyang Technological University, Singapore (SG)

( * ) Notice: Subject to any disclaimer, the term of this patent is extended or adjusted under 35 U.S.C. 154(b) by 302 days.

(21) Appl. No.: 13/882,783

(22) PCT Filed: Nov. 1, 2011

(86) PCT No.: PCT/SG2011/000386
§ 371 (c)(1),
(2), (4) Date: May 1, 2013

(87) PCT Pub. No.: WO2012/060778
PCT Pub. Date: May 10, 2012

(65) Prior Publication Data
US 2013/0240440 A1 Sep. 19, 2013

Related U.S. Application Data

(60) Provisional application No. 61/408,753, filed on Nov. 1, 2010.

(51) Int. Cl.
*B01D 65/08* (2006.01)
*B01D 65/10* (2006.01)
(Continued)

(52) U.S. Cl.
CPC .............. *B01D 65/08* (2013.01); *B01D 61/12* (2013.01); *B01D 61/14* (2013.01); *B01D 65/102* (2013.01);
(Continued)

(58) Field of Classification Search
CPC ........ B01D 61/10; B01D 61/12; B01D 61/14; B01D 61/20; B01D 61/22; B01D 65/08;
(Continued)

(56) References Cited

U.S. PATENT DOCUMENTS 4,770,770 A * 9/1988 Regunathan ............ C02F 1/441
210/102
5,320,760 A 6/1994 Freund et al.
(Continued)

FOREIGN PATENT DOCUMENTS

CN 201353457 Y 12/2009
GB 2422330 A 7/2006
(Continued)

OTHER PUBLICATIONS

International Search Report for Application No. PCT/SG2011/000386 dated Feb. 3, 2012.
(Continued)

*Primary Examiner* — David C Mellon
(74) *Attorney, Agent, or Firm* — Lerner, David, Littenberg, Krumholz & Mentlik, LLP

(57) ABSTRACT

A membrane sensor for detecting fouling, the membrane sensor comprising a first chamber having an inlet and an outlet; a second chamber having an outlet; only one membrane, the membrane being disposed between the first chamber and the second chamber for allowing fluid to permeate the membrane from the first chamber to the second chamber; a first pressure transducer configured for obtaining a first pressure upstream of the membrane; a second pressure
(Continued)

transducer configured for obtaining a second pressure downstream of the membrane; and a resistance regulator configured for adjusting the second pressure.

17 Claims, 11 Drawing Sheets

(51) Int. Cl.
  *B01D 61/12* (2006.01)
  *B01D 61/14* (2006.01)
(52) U.S. Cl.
  CPC ...... *B01D 2311/04* (2013.01); *B01D 2311/06* (2013.01); *B01D 2311/14* (2013.01)
(58) Field of Classification Search
  CPC ............ B01D 2311/04; B01D 2311/06; B01D 2311/08; B01D 2311/14; B01D 2313/19; B01D 65/102
  See application file for complete search history.

(56) References Cited

U.S. PATENT DOCUMENTS

| | | | |
|---|---|---|---|
| 5,484,536 A | 1/1996 | Yamaguchi et al. | |
| 5,498,328 A | 3/1996 | Smith-Haddon | |
| 6,077,435 A | 6/2000 | Beck et al. | |
| 6,306,291 B1 | 10/2001 | Lueck | |
| 6,463,790 B1 | 10/2002 | Chun et al. | |
| 7,316,780 B1 * | 1/2008 | Fendya | A23C 9/1422 210/503 |
| 2007/0181496 A1 * | 8/2007 | Zuback | B01D 61/025 210/636 |
| 2009/0045144 A1 * | 2/2009 | Cohen | B01D 61/025 210/745 |
| 2009/0177412 A1 * | 7/2009 | Phattaranawik | B01D 61/025 702/35 |
| 2009/0194485 A1 | 8/2009 | Colotte et al. | |
| 2009/0255877 A1 * | 10/2009 | Bair | B01D 63/10 210/739 |
| 2010/0163495 A1 | 7/2010 | Merino et al. | |

FOREIGN PATENT DOCUMENTS

| | | |
|---|---|---|
| WO | 9810856 A1 | 3/1998 |
| WO | 2007129994 A1 | 11/2007 |
| WO | 2009076980 A1 | 6/2009 |
| WO | 2010147557 A1 | 12/2010 |
| ZA | 200404213 A | 4/2006 |

OTHER PUBLICATIONS

Phattaranawik J et al: "Novel membrane-based sensor for online membrane integrity monitoring", Journal of Membrane Science. Elsevier, vo 1 • 323, No. 1, Oct. 1, 2008 (Oct. 1, 2008). pp. 113-124, XP023439657, ISSN: 0376-7388. DOI: 10. 1016/J. MEMSCI. 2008. 06. 008 [retrieved on Jun. 13, 2008] the whole document.
Supplementary European Search Report for Application No. EP11838328 dated Sep. 22, 2014.

* cited by examiner

MEMBRANE SENSOR AND METHOD OF DETECTING FOULING IN A FLUID

CROSS-REFERENCE TO RELATED APPLICATIONS

The present application is a national phase entry under 35 U.S.C. § 371 of International Application No. PCT/SG2011/000386 filed Nov. 1, 2011, published in English, which claims the benefit of the filing date of U.S. Provisional Patent Application No. 61/408,753 filed Nov. 1, 2010, all of which are incorporated herein by reference.

TECHNICAL FIELD

The present invention relates generally to a membrane sensor and method of detecting fouling in a fluid, and more particularly but not exclusively to a membrane sensor and method of monitoring fouling of a filtration membrane and/or detecting presence of a foulant in a fluid.

BACKGROUND

In order to ensure a long operating lifetime for commercial fluid filtration apparatus employing membrane modules, it is necessary to have on-line monitoring to detect any changes in feed streams that could damage the membrane modules or necessitate costly shutdowns. Conventional techniques such as particle sensing, turbidity measurement, and microbial monitoring suffer from one or more disadvantages such as high cost, low sensitivity or long response time.

In one example of on-line monitoring, as disclosed in PCT Publication Nos. WO 2007/129994 and WO2010/147557, effluent of a membrane filtration apparatus comprising a membrane module upstream of a detection apparatus is directed through a first membrane and then through a second membrane of the detection apparatus. As effluent passes through the first and second membranes of the detection apparatus, pressure measurements are made at three pressure regions in the detection apparatus: a first pressure $P_1$ at a feed side of the first membrane, a second pressure $P_2$ between the first and second membranes, and a third pressure $P_3$ at a permeate side of the second membrane. A ratio $\Pi$ called the relative trans-membrane pressures (TMP) is then determined using the equation $\Pi=(P_1-P_2)/(P_2-P_3)$, and is used to determine the integrity of the filtration membrane or the presence of a foulant in the fluid. This is done by determining if the ratio $\Pi$ or a time-derivative of the ratio $d\Pi/dt$ is higher than a respective threshold.

However, for such detection apparatus and methods, the pressure-ratio metric becomes progressively less sensitive to the presence of fouling agents in the feed stream as the first membrane becomes more fouled with time. The detection apparatus needs to be cleaned to remove the fouling materials. Although cleaning can be done by backwashing, i.e., reversing direction of fluid flow in the detection apparatus, backwashing creates another problem when there is fouling on the second membrane by finer foulants that slip through the first membrane. This is because backwashing would push the foulant from the second membrane onto the permeate side of the first membrane. Furthermore, sensitivity of the pressure differential ratio metric used to assess changes in the feed stream reduces when there is fouling of the second membrane. Fouling of the second membrane increases the second TMP, i.e., $P_2-P_3$, in turn stabilising the $\Pi$ values. The stable $\Pi$ values thus give a false indication that the detection apparatus is still sensitive when the first membrane has in fact been fouled and sensitivity has already been compromised. In addition, although it can be shown that the pressure differential ratio metric provides maximum sensitivity when the resistance of an unfouled first membrane is zero, this is impossible to achieve in practice because the presence of any membrane and its support in the fluid stream necessarily introduces some resistance to permeation flow through the membrane.

SUMMARY

The present membrane sensor comprises only one membrane and uses a resistance regulator for adjusting flow to any desired value. It uses a metric for assessing changes in the feed stream in which maximum sensitivity occurs when resistance of the one membrane is equal to the adjustable resistance to flow. The resistance regulator is preferably fabricated so as to avoid any fouling by materials that pass through the one membrane. Convenient cleaning of the one membrane via simple backwashing is thus permitted. High sensitivity can thus be maintained by the membrane sensor even when the one membrane is highly fouled. This permits operating of the membrane sensor for detecting changes in the feed stream for longer periods between instances of backwashing to remove fouling on the one membrane.

According to a first exemplary aspect, there is provided a membrane sensor for detecting fouling, the membrane sensor comprising: a first chamber having an inlet and an outlet; a second chamber having an outlet; only one membrane, the membrane being disposed between the first chamber and the second chamber for allowing fluid to permeate the membrane from the first chamber to the second chamber; a first pressure transducer configured for obtaining a first pressure upstream of the membrane; a second pressure transducer configured for obtaining a second pressure downstream of the membrane; and a resistance regulator configured for adjusting the second pressure.

The resistance regulator may be disposed downstream of the second chamber.

The resistance regulator may comprise at least one adjustable valve. Alternatively, the resistance regulator may comprise at least one capillary tube with an adjustable orifice. The membrane sensor may further comprise a third pressure transducer configured for obtaining a third pressure downstream of the resistance regulator.

The second pressure transducer may be disposed downstream of the outlet of the second chamber and upstream of the resistance regulator.

The first chamber may be configured to allow some fluid received at the inlet of the first chamber to flow over the membrane to the outlet of the first chamber.

The first pressure transducer may be disposed upstream of the inlet of the first chamber.

In an alternative embodiment, the membrane sensor may be configured to allow reverse fluid flow in the membrane sensor for fluid to permeate the membrane from the second chamber to the first chamber.

The first pressure transducer may be disposed downstream of the outlet of the first chamber.

The first pressure transducer may be disposed downstream of the outlet of the second chamber.

The second chamber may further have an inlet.

The second chamber may be configured to allow some fluid received at the inlet of the second chamber to flow over the membrane to the outlet of the second chamber.

The membrane sensor may further comprise a control valve for directing fluid selectably to the inlet of the first chamber or to the inlet of the second chamber.

The membrane may be disposed on a plane substantially parallel to a fluid path between the first inlet and the first outlet of the first chamber.

The membrane sensor may further comprise a pressure regulator configured for controlling fluid flow rate to the first chamber.

The pressure regulator may be further configured for smoothening the first pressure.

The membrane sensor may further comprise a backpressure regulator configured for adjusting the first pressure, the backpressure regulator being disposed downstream of the outlet of the first chamber and downstream of the first pressure transducer.

The membrane may be supported by a porous plate.

The membrane sensor may further comprise a plurality of parallel vanes configured for directing fluid from the inlet of the first chamber to the outlet of the first chamber.

Resistance of the resistance regulator may be set equal to a resistance of the membrane when the membrane is new.

According to a second exemplary aspect, there is provided a method of detecting fouling in a fluid using only one membrane disposed between a first chamber and a second chamber, the method comprising: permeating a fluid through the membrane from the first chamber to the second chamber; obtaining a first pressure upstream of the membrane; adjusting a second pressure downstream of the membrane by setting a resistance of a resistance regulator equal to a resistance of the membrane when the membrane is new; obtaining the second pressure; and determining a ratio between $(P_1-P_2)$ and $(P_2)$, $P_1$ being the first pressure and $P_2$ being the second pressure.

The method may further comprise obtaining a third pressure downstream of the resistance regulator, wherein determining the ratio between $(P_1-P_2)$ and $(P_2)$ comprises determining a ratio between $(P_1-P_2)$ and $(P_2-P_3)$, $P_3$ being the third pressure.

The method may further comprise allowing some fluid received at an inlet of the first chamber to flow over the membrane to an outlet of the first chamber.

The method may further comprise permeating fluid through the membrane from the second chamber to the first chamber. [this is to cover the backward flow provided by the embodiment of FIG. 16]

The method may further comprise allowing some fluid received at an inlet of the second chamber to flow over the membrane to an outlet of the second chamber.

The method may further comprise controlling fluid flow rate to the first chamber.

The method may further comprise smoothening the first pressure.

The method may further comprise adjusting the first pressure.

Resistance of the membrane may be a resistance of the membrane when the membrane has been fouled.

According to a third exemplary aspect, there is provided a treatment apparatus, comprising the membrane sensor as described above in fluid communication with an upstream membrane filtration apparatus, wherein fluid received on the membrane of the membrane sensor is an effluent of the upstream membrane filtration apparatus.

The treatment apparatus may further comprise a control unit configured for receiving the obtained first and second pressures, determining a ratio between $(P_1-P_2)$ and $(P_2)$, $P_1$ being the first pressure and $P_2$ being the second pressure, and correlating the ratio with one selected from the group consisting of: a failure of the upstream membrane filtration apparatus and a presence of a foulant in the effluent.

The control unit may be further configured to selectably direct fluid alternately to the first chamber and the second chamber based on a pre-set interval or a pre-set value of the ratio between $(P_1-P_2)$ and $(P_2)$.

BRIEF DESCRIPTION OF THE FIGURES

Preferred embodiments of the apparatus and method will now be described with reference to the accompanying figures in which.

DETAILED DESCRIPTION OF THE PREFERRED EMBODIMENTS

Exemplary embodiments of the membrane sensor 100, a method 200 of detecting fouling in a fluid and a treatment apparatus will now be described with reference to FIGS. 1 to 21.

Figure 1:
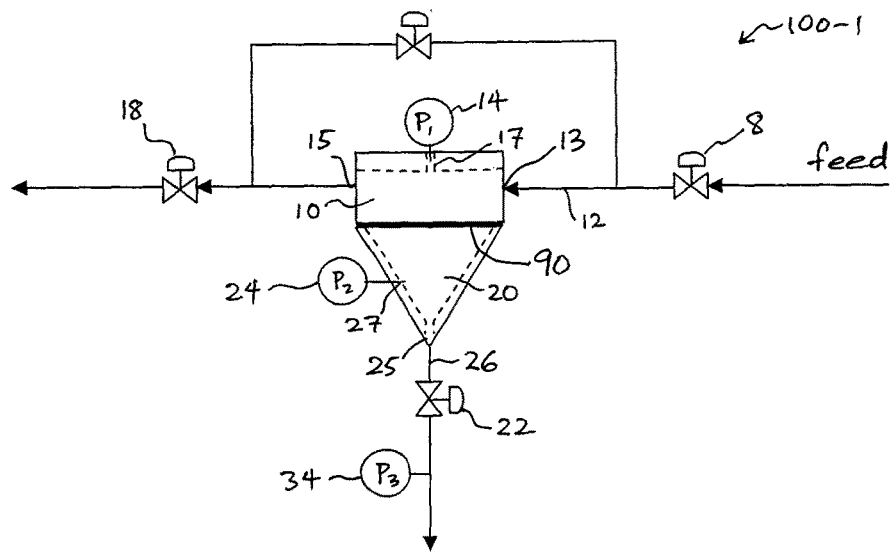
FIG. 1 is a schematic view of an exemplary embodiment of a membrane sensor.

As shown in FIG. 1, in a first exemplary embodiment, the membrane sensor 100-1 comprises a flow cell that has two compartments or chambers 10, 20, that is, a first chamber 10 and a second chamber 20, and only one membrane 90 in series with an adjustable resistance regulator 22. The membrane 90 is disposed between the first chamber 10 and the second chamber 20 for allowing fluid to permeate the membrane 90 from the first chamber 10 to the second chamber 20. The resistance regulator 22 is preferably disposed downstream of the second chamber 20, and may be rigidly attached to the lower compartment or second chamber 20. Ports, that is, an inlet or inflow port 13 and an outlet or outflow port 15 of the upper compartment or first chamber 10 permit inflow of a feed stream (via a feed line 12) and outflow of that portion of this feed stream that does not permeate through the membrane 90, respectively. An outlet 25 of the second chamber 20 permits outflow of the permeate from the second chamber 20 via a drain line 26.

The membrane 90 preferably has pore diameters in the range of 0.1 to 1 μm (micrometers or microns) although a membrane 90 with smaller or larger pores can be used in the present invention. The adjustable flow resistance regulator 22 preferably has an effective diameter for permeate flow in the range of 0.25 to 2 millimeters, although a smaller or larger diameter can be used.

In order to provide for backwashing via pressurized counterflow through the membrane 90 in order to clean the membrane 90, the membrane 90 can be supported on its top side, that is, the side adjacent the first chamber 10, via metal, ceramic or polymer wires, thin strips or a screen. The membrane 90 and underlying support are preferably sealed within the upper compartment or first chamber 10 via one or more O-rings or other appropriate gaskets.

A first pressure $P_1(t)$ is obtained by a first pressure transducer 14 configured for obtaining the first pressure upstream of the membrane 90, 204. A second pressure $P_2(t)$ is obtained by a second pressure transducer 24 configured for obtaining the second pressure, downstream of the membrane 90, 208. In this embodiment, ports 17, 27 are provided in the chambers 10, 20 respectively, for connection of the pressure transducers 14, 24 to the first and second chambers 10, 20, to obtain pressures in the first and second chambers 10, 20 respectively.

A third pressure $P_3(t)$ may be obtained by a third pressure transducer 34 configured for obtaining the third pressure downstream of the resistance regulator 22. The first pressure $P_1(t)$ above or upstream of the membrane 90 is set to be higher than the third pressure $P_3(t)$ downstream of the adjustable resistance regulator 22. The notation $P_i(t)$ denotes that the particular pressure $P_i$ (i=1, 2, or 3) can be a function of time. A feed stream or a portion of the feed stream is allowed to flow onto or over the membrane 90. A portion of this feed stream permeates through the membrane 90 as a permeate, owing to a pressure difference maintained across the membrane 90. Remaining feed stream that does not permeate through the membrane 90 flows out of the membrane sensor 100-1 to be disposed of or recycled.

The membrane 90 is preferably appropriately sealed and supported between the two chambers 10, 20. In one embodiment, the membrane 90 rests on a porous rigid support plate that can be a sintered metal, ceramic or polymer particle membrane, perforated metal, ceramic or polymer plate, metal, ceramic or polymer screen, or any other highly permeable rigid support structure. The membrane 90 could also be made to be self-supporting such as using a porous rigid support plate as the membrane 90 itself, or using a hollow fiber membrane 90.

All or a portion of the feed stream permeates through the membrane 90 owing to the higher pressure maintained in the upper compartment or first chamber 10, 202. All or most of any fouling materials in the portion of the feed stream that permeates through the membrane 90 are deposited on or in the membrane 90. Any smaller fouling materials that pass through the membrane 90 will also pass through the adjustable resistance regulator 22 which has a much larger cross-sectional area available for flow compared to the membrane 90. The permeate along with any fouling materials not collected by the membrane 90 will also flow through the adjustable resistance regulator 22. The permeate flowing through the membrane 90 will cause a pressure drop $P_1(t)-P_2(t)$. The permeate flowing through the adjustable resistance regulator 22 will cause a pressure drop $P_2(t)-P_3(t)$. In the absence of any fouling of the membrane 90, the pressure drop $P_1(t)-P_2(t)$ will be equal to the pressure drop $P_2(t)-P_3(t)$ if the resistance $R_2$ of the adjustable resistance regulator 22 is set equal to the resistance $R_1(0)$ of the unfouled membrane 90, 206.

However, it is not essential that the adjustable resistance $R_2$ should be equal to the initial membrane resistance $R_1(0)$. As a result of build-up of a fouling layer on the membrane 90 with time, when fouling occurs on the membrane 90, the pressure drop or differential $P_1(t)-P_2(t)$ will increase relative to the pressure drop or differential $P_2(t)-P_3(t)$. This increase in the pressure drop $P_1(t)-P_2(t)$ across the membrane 90 relative to the pressure drop $P_2(t)-P_3(t)$ across the adjustable resistance regulator 22 provides a means for detecting fouling materials in the feed stream being sampled by the membrane sensor 100. The operation of the membrane sensor 100-1 requires continuous measuring of individual pressures $P_1(t)$, $P_2(t)$ and $P_3(t)$ via appropriate pressure transducers such as pressure transducers or gauges, or continuous measuring of the pressure differentials $P_1(t)-P_2(t)$ and $P_2(t)-P_3(t)$ via appropriate differential pressure transducers such as pressure transducers or gauges, as will be explained below.

As described in PCT publication no. WO/2007/129994, a metric for assessing the quality of a feed stream may be defined as follows:

$$\Pi = \frac{P_1(t) - P_2(t)}{P_2(t) - P_3(t)} \tag{1}$$

Since permeation flow through the membrane 90 and through the adjustable resistance regulator 22 of the present membrane sensor 100-1 are set to be equal, it can be shown that ratio of the pressure differentials in Equation (1) is equal to a ratio of the resistance $R_1(t)$ of the membrane 90 to the resistance $R_2$ of the adjustable resistance regulator 22, that is, $$\Pi = \frac{R_1(t)}{R_2} \tag{2}$$

where the notation $R_1(t)$ indicates that the resistance of the membrane 90 can change with time owing to the added resistance of a fouling layer on the membrane 90. In contrast, the resistance $R_2$ is nominally fixed at a value determined by appropriate adjustment of the adjustable resistance regulator 22. Small changes in the resistance $R_2$ can occur due to changing friction factors caused by Reynolds number changes in a value. Other methods of fixing $R_2$, in which friction factors are unaffected by Reynolds number, such as flow through a capillary tube, can also be employed. A measure of the sensitivity of the Π-metric is given by normalized differential change in Π owing to a differential change in the resistance $R_1(t)$ as follows:

$$\frac{1}{\Pi}\frac{d\Pi}{dR_1} = \frac{1}{R_1(t)} \quad (3)$$

By inspection of Equation (3), we see that the sensitivity is independent of the value of the adjustable resistance $R_2$ and is a maximum when the resistance $R_1(t)$ of the membrane 90 is equal to zero. However, setting $R_1(t)=0$ is unrealizable in practice since it would imply that the membrane 90 has no resistance to permeation flow through it. The membrane 90 must offer some resistance to flow even in its unfouled state in order for there to be a measurable Π-metric. Moreover, the sensitivity of the Π-metric monotonically decreases as the membrane 90 continuously fouls, thereby causing an increase in $R_1(t)$. Since the sensitivity of the Π-metric is independent of the value of the resistance $R_2$ of the adjustable resistance regulator 22, nothing can be done to restore high sensitivity once fouling has occurred to a significant extent, other than to clean the membrane 90. Another disadvantage of the Π-metric is that it is unbounded; that is, it does not have an upper limit that provides some measure of the relative extent of fouling of the membrane 90. If the adjustable resistance $R_2$ is set equal to the resistance $R_1(0)$ of the unfouled membrane 90, the Π-metric ranges between one and infinity; that is, $$1 \leq \Pi < \infty \quad (4)$$

The present membrane sensor 100-1 therefore provides a new metric, henceforth referred to as the C-metric, for assessing the quality of a feed stream to be detected by the membrane sensor 100. The C-metric is defined as follows:

$$C = \frac{[(P_1(t) - P_2(t)] - [P_2(t) - P_3(t)]}{(P_1(t) - P_3(t))} \quad (5)$$

Since the permeation flow through the membrane 90 and through the adjustable resistance regulator 22 are equal, it can be shown that the pressure differentials in Equation (5) can be expressed in terms of the resistance of the membrane $R_1(t)$ and the resistance $R_2$ of the adjustable resistance regulator 22 as follows:

$$C = \frac{R_1(t) - R_2(t)}{R_1(t) + R_2(t)} \quad (6)$$

A measure of the sensitivity of the C-metric is given by normalized differential change in the C-metric owing to a differential change in the resistance $R_1(t)$ as follows:

$$\frac{1}{C}\frac{dC}{dR_1} = \frac{2R_2}{[R_1(t) - R_2][R_1(t) + R_2]} \quad (7)$$

By inspection of Equation (7), we see that the sensitivity is zero when $R_2=0$, but becomes unbounded when $R_2=R_1$: that is, the sensitivity of the C-metric is a maximum when the resistance $R_2$ of the adjustable resistance regulator 22 is equal to that of the membrane 90, 206.

A significant advantage of the present membrane sensor 100-1 is that the use of the adjustable resistance regulator 22 to adjust $R_2$ permits obtaining maximum initial sensitivity for the membrane sensor 100-1 by setting $R_2=R_1(0)$, 206, where $R_1(0)$ is the value of the resistance $R_1$ prior to any fouling of the membrane. Equation (3) indicates that sensitivity of the C-metric monotonically decreases as the membrane resistance $R_1(t)$ increases owing to fouling on the membrane 90.

Another significant advantage of the present membrane sensor 100-1 is that the adjustable resistance $R_2$ can be increased at will as the membrane resistance $R_1(t)$ increases to re-establish the condition $R_2=R_1(t)$, 206, thereby restoring maximum sensitivity even when the membrane 90 is fouled.

A further advantage of the present membrane sensor 100-1 is that the C-metric is bounded. If the adjustable resistance $R_2$ is set equal to the resistance of the unfouled membrane $R_1(0)$, the C-metric is bounded between zero and one; that is, $$0 \leq C \leq 1 \quad (8)$$

Hence, the value of the C-metric, which is part of the present invention, provides a direct quantitative measure of the degree of fouling on the membrane 90. The use of the adjustable resistance regulator 22 provides a significant advantage by avoiding any fouling of the resistance regulator 22 itself since the cross-sectional area for permeation flow through the resistance regulator 22 is several orders of magnitude larger than the largest pore in the membrane 90. Hence, any fouling materials that pass through the membrane 90 will easily pass through the adjustable resistance regulator 22 without causing any fouling or collection of particulates to the resistance regulator 22 itself. This relatively large cross-sectional area in the adjustable resistance regulator 22 permits convenient simple backwashing of the membrane 90 when removal of fouling deposits on or in the membrane 90 is necessary. The adjustable resistance regulator 22 could be one or more adjustable valves, one or more capillary tubes with adjustable orifices, or one or more of any similar device for providing an adjustable resistance to flow.

From the above description, it can be seen that measuring the pressure differentials has an advantage since the pressure differentials rather than the individual pressures appear in the Π-metric and C-metric. Measuring the pressure differentials thus reduces the cumulative error associated with measuring the pressure since only two rather than three measurements are required. This in turn reduces the cumulative error in the Π- and C-metrics used to assess the quality of the feed stream.

The Π-metric defined by Equation (1) and the C-metric defined by Equation (5) are determined continuously or nearly continuously from the measured pressures or pressure differentials. A change in the feed stream quality that could cause fouling on or in any membrane modules of a membrane filtration system into which this feed stream flows is detected in the present membrane sensor 100-1 by a change in the Π-metric and/or the C-metric. The change in feed stream quality is indicated both by the instantaneous magnitude of the Π-metric and/or the C-metric and by the rate that either or both metrics change with time.

One standard measure of feed stream quality is the Silt Density index (SDI). The SDI is defined by American Standard for Testing Materials (ASTM) D4189 as follows:

$$SDI = \frac{100\left(1 - \frac{t_I}{t_F}\right)}{15 \text{ m}} \quad (9)$$

where $t_1$ is the time required to a collect 500 ml (milliliters) of the feed through a 0.45 micrometer membrane or filter disc at 30 psig (pounds per square inch gauge), and $t_F$ is the time required to collect 500 ml of the feed through the same membrane or filter disc after 15 minutes of continuously passing this feed through the membrane or filter disc. A specified SDI corresponds to a certain rate of fouling. Typically the feed stream to spiral-wound reverse osmosis systems should have an SDI less than 5.0, whereas the feed stream to hollow fiber reverse osmosis systems should have an SDI less than 3.0.

One way that the present membrane sensor 100-1 can be used to assess the change in feed stream quality is to correlate the tune-rate-of change of the Π-metric and/or the C-metric with the SDI. A calibration curve would consist of a plot of the time-rate-of-change of the Π-metric and/or the C-metric as a function of SDI. Increasing values of the SDI will correspond to increasing values of the time-rate-of change of the Π-metric and/or the C-metric. This correlation plot then can be used to determine if the rate of fouling determined using the present invention exceeds the SDI recommended for the particular spiral-wound, reverse osmosis, or other system whose operation can be compromised by the presence of excessive fouling materials. The metrics can also be correlated with the Modified Fouling Index (MFI), which is based on the SDI taking into account the occurrence of gelfiltration.

Figure 2:
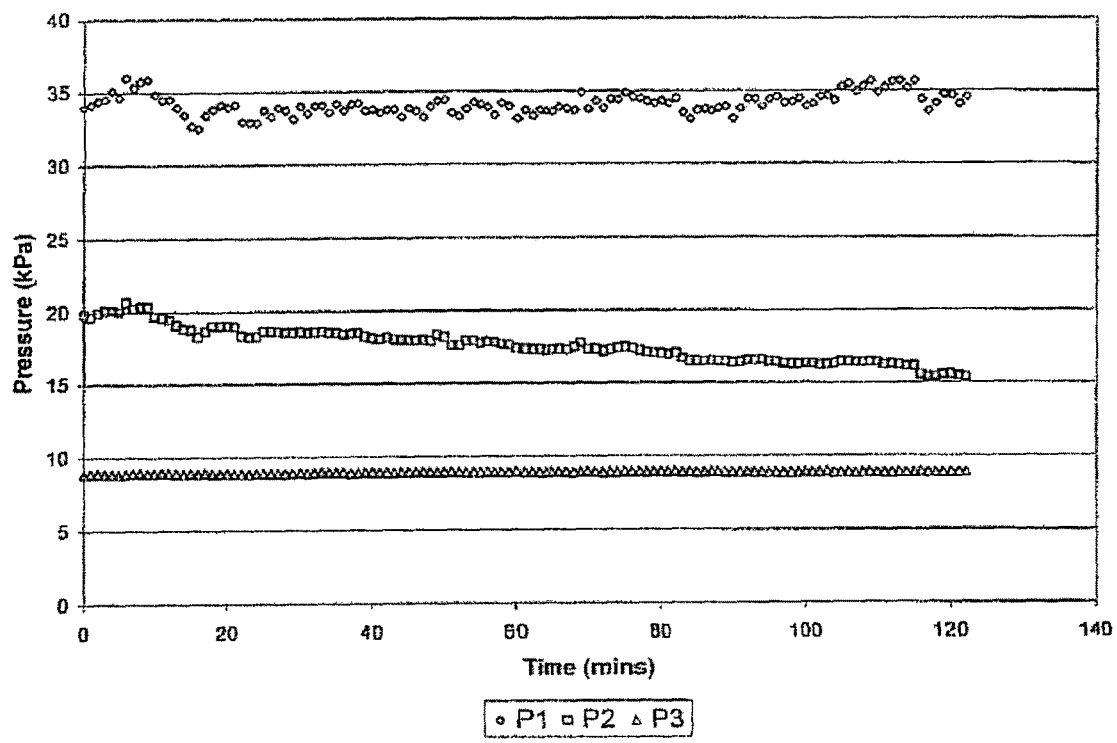
FIG. 2 is a graph of pressure with time for a silt density index (SDI) of 0.6.
Figure 3:
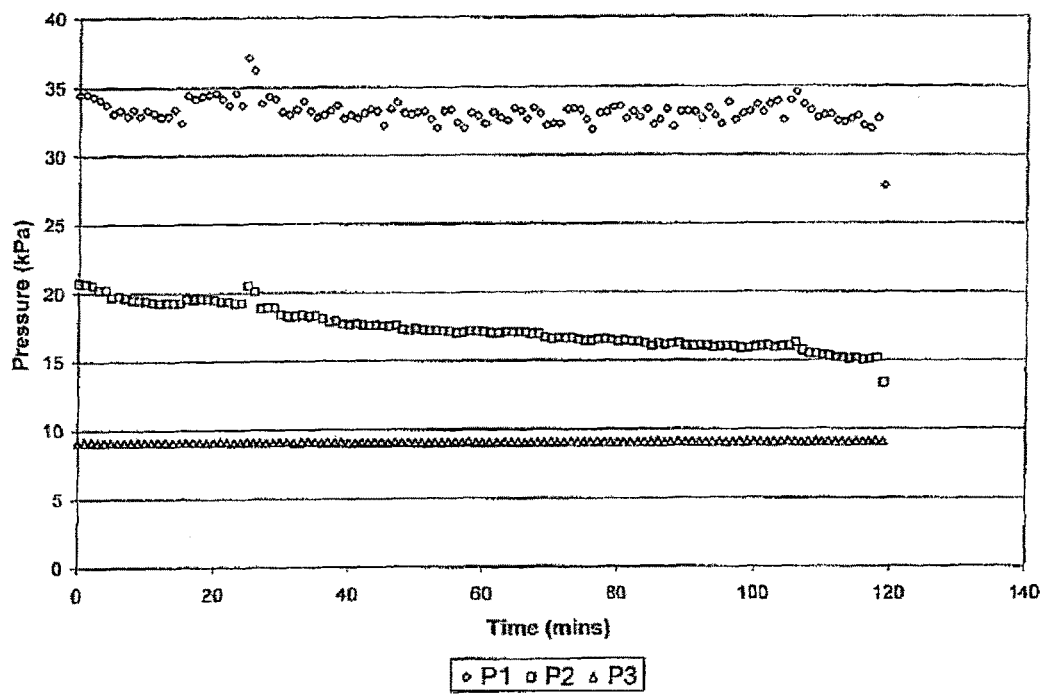
FIG. 3 is a graph of pressure with time for a silt density index (SDI) of 2.7.
Figure 4:
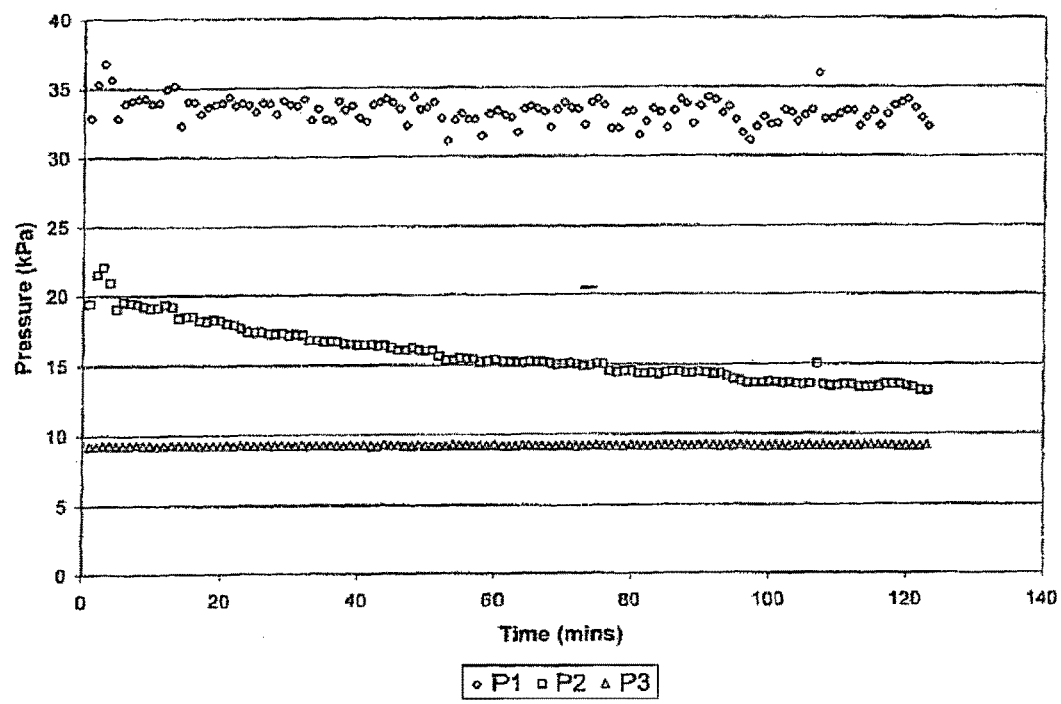
FIG. 4 is a graph of pressure with time for a silt density index (SDI) of 5.5.
Figure 5:
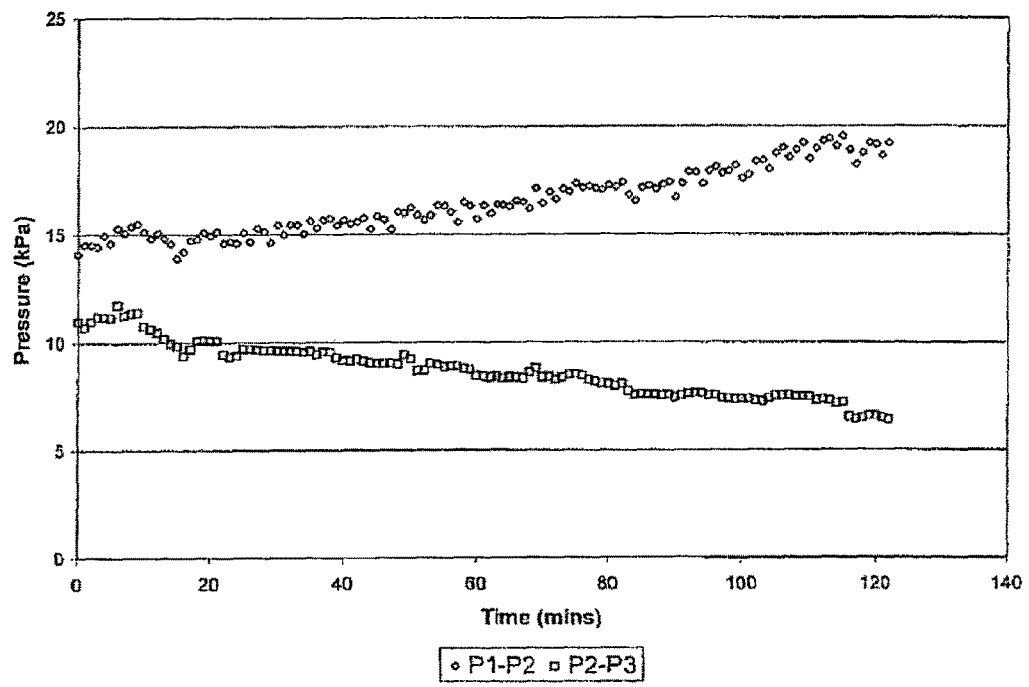
FIG. 5 is a graph of differential pressure with time for a silt density index (SDI) of 0.6.
Figure 6:
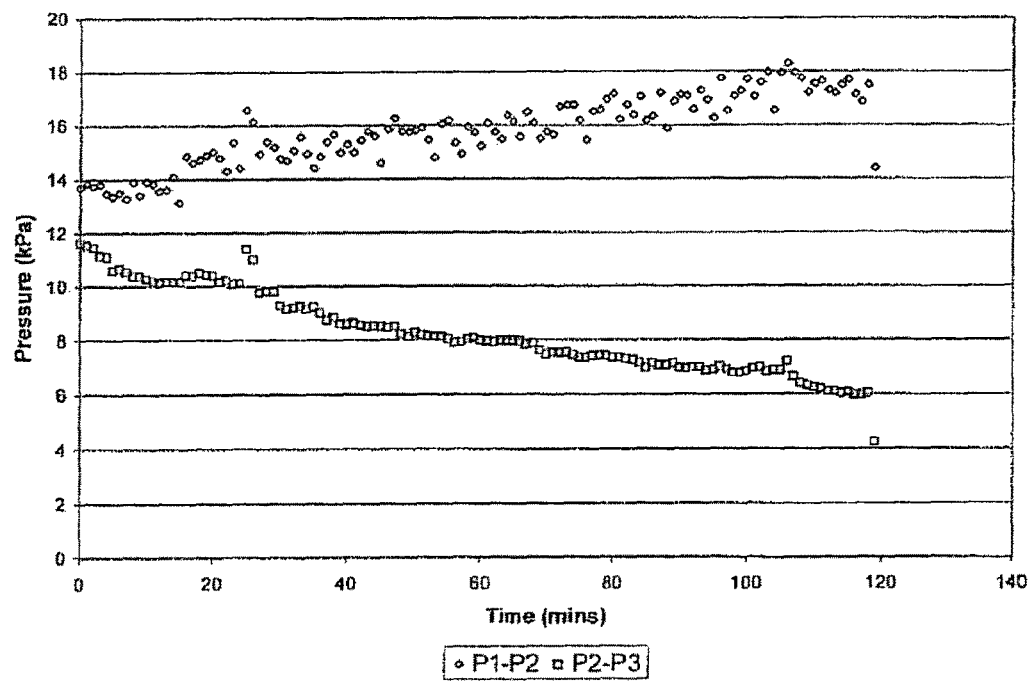
FIG. 6 is a graph of differential pressure with time for a silt density index (SDI) of 2.7.
Figure 7:
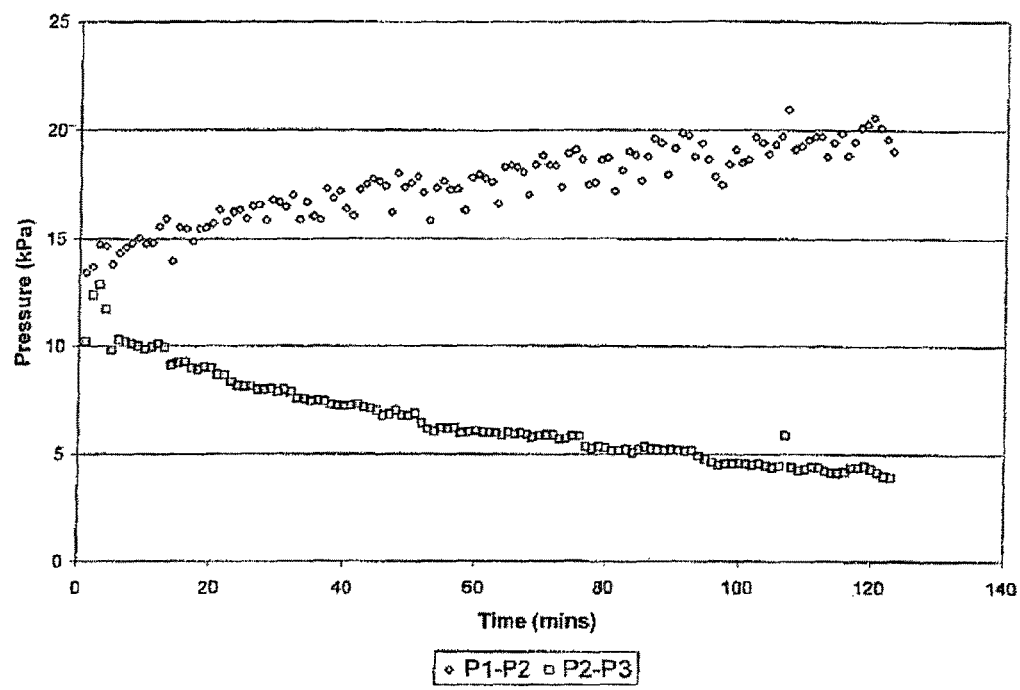
FIG. 7 is a graph of differential pressure with time for a silt density index (SDI) of 5.5.
Figure 8:
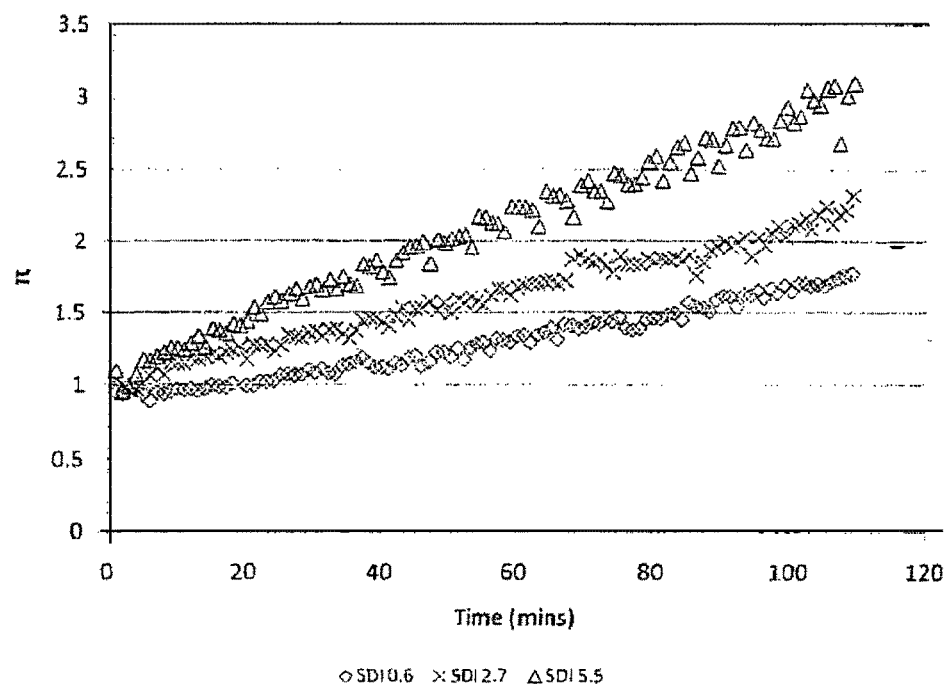
FIG. 8 is a graph of a Π-metric with time for SDI of 0.6, 2.7 and 5.5.
Figure 9:
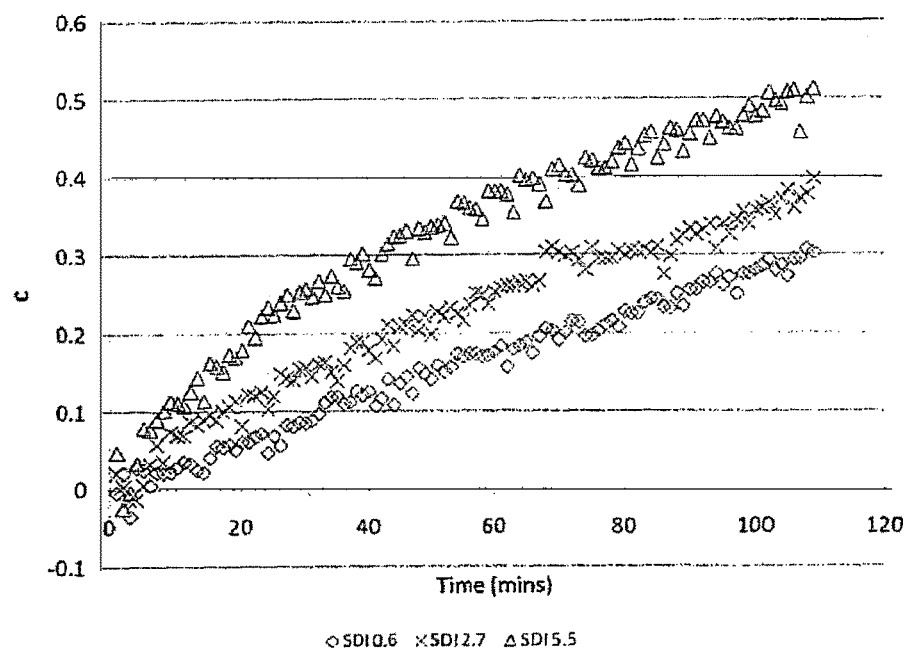
FIG. 9 is a graph of a C-metric with time for SDI of 0.6, 2.7 and 5.5.

Representative data for the performance of the present membrane sensor 100-1 were taken for an aqueous feed stream containing hollow glass spheres having a diameter of 10 μm that were chosen to be neutrally buoyant in order to avoid any settling of particulates. The feed stream containing a specified concentration of glass spheres flowed into the upper compartment or first chamber 10 of the present membrane sensor 100-1 at a flow rate of 70 ml/min (milliliters per minute) at a fixed pressure of 30 kPa (kilopascals). The present membrane sensor 100-1 employed a membrane 90 having a diameter of 4.7 cm (centimeters) and a nominal pore diameter of 0.45 μm. FIGS. 2, 3 and 4 show the pressures $P_1(t)$, $P_2(t)$ and $P_3(t)$ in kPa as a function of time in minutes for glass sphere concentrations of 0.005, 0.03, and 0.05 WI (grains per liter), corresponding to SDI values of 0.6, 2.7, and 5.5, respectively. FIGS. 2, 3, and 4 show that the pressures $P_1(t)$ and $P_3(t)$ are essentially constant, whereas the pressure $P_2(t)$ decreases with increasing time owing to progressively more fouling of the membrane. FIGS. 5, 6, and 7 show the corresponding pressure differentials $P_1(t)-P_2(t)$ and $P_2(t)-P_3(t)$ as a function of time for each of the glass sphere concentrations. FIGS. 5, 6, and 7 show that the pressure differential $P_1(t)-P_2(t)$ increases and the pressure differential $P_2(t)-P_3(t)$ decreases with increasing time owing to progressively more fouling of the membrane. The Π-metric and C-metric can be determined from the pressures or pressure differentials in FIGS. 2, 3, and 4 and FIGS. 5, 6, and 7 and are plotted as a function of time in FIGS. 8 and 9, respectively. FIGS. 8 and 9 show that the Π-metric progressively increases from the value Π=1 and the C-metric progressively increases from the value C=0 owing to progressively more fouling of the membrane 90.

Figure 10:
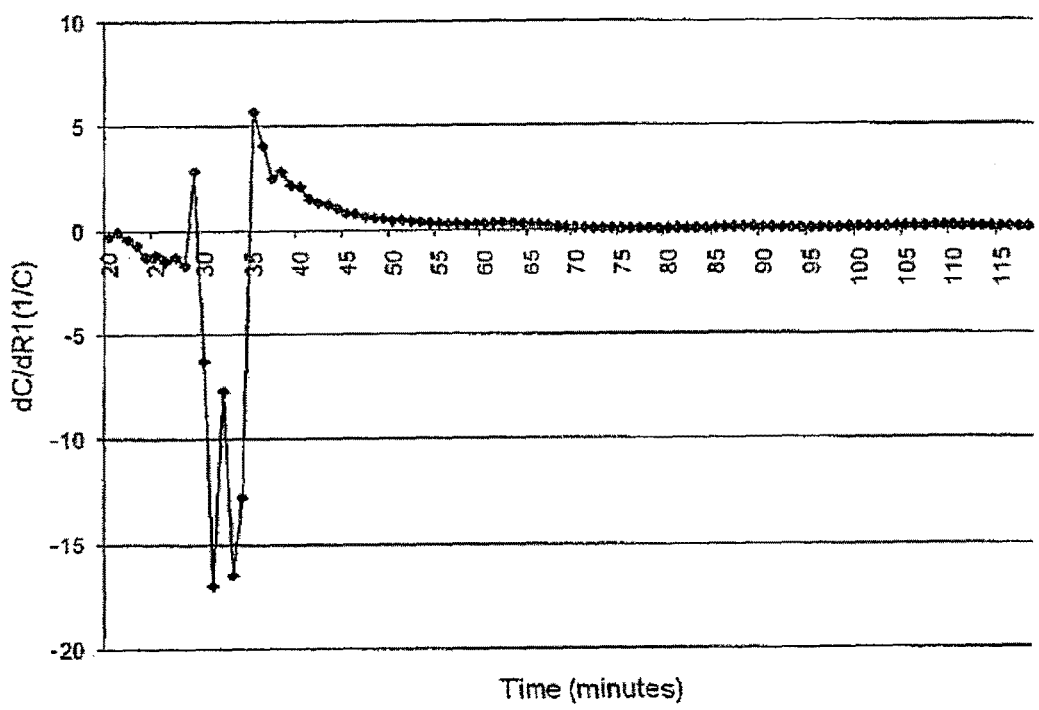
FIG. 10 is a graph of $(1/C)dC/dR_1$ with time without adjusting resistance $R_2$.
Figure 11:
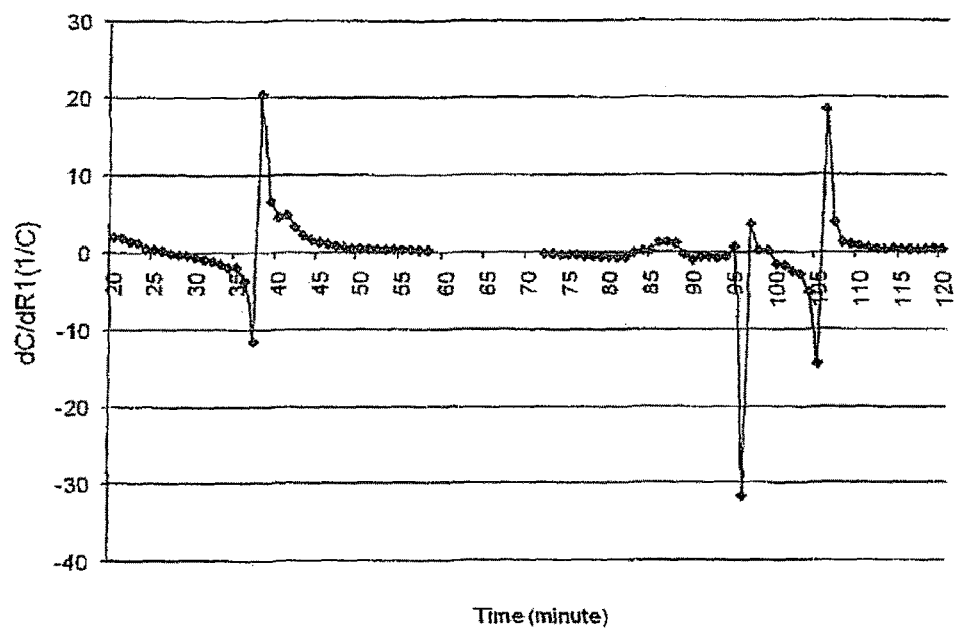
FIG. 11 is a graph of $(1/C)dC/dR_1$ with time with adjustment of resistance $R_2$.

One advantage of the present invention is that the adjustable resistance $R_2$ can be changed after some degree of fouling has occurred in order to restore the initial high sensitivity of the present membrane sensor 100, 206. FIGS. 10 and 11 shows a plot of $(1/C)dC/dR_1$ versus time. A concentration of 0.05 g/l of glass spheres was added at 30 minutes (FIGS. 10) and 35 minutes (FIG. 11). The feed was changed to a clean solution at 50 minutes, and a concentration of 0.005 g11 of glass spheres was added at 95 minutes. In FIG. 10, the adjustable resistance $R_2$ was unchanged. In FIG. 11, the adjustable resistance $R_2$ was increased from its initial value, which was equal to the resistance of the unfouled supported membrane 90, to that of the fouled supported membrane 90, 206. FIG. 11 shows that the sensitivity of the C-metric increased significantly as a result of setting the adjustable resistance $R_2$ equal to the resistance $R_1$ of the fouled supported membrane 90, 206, thus demonstrating the advantage of the present membrane sensor 100-1 in being able to adjust the resistance in the lower compartment or second chamber 20, and in employing the novel C-metric whose sensitivity is a maximum when the adjustable resistance $R_2$ is equal to that of the supported membrane 90 and associated fouling layer, if any.

Figure 12:
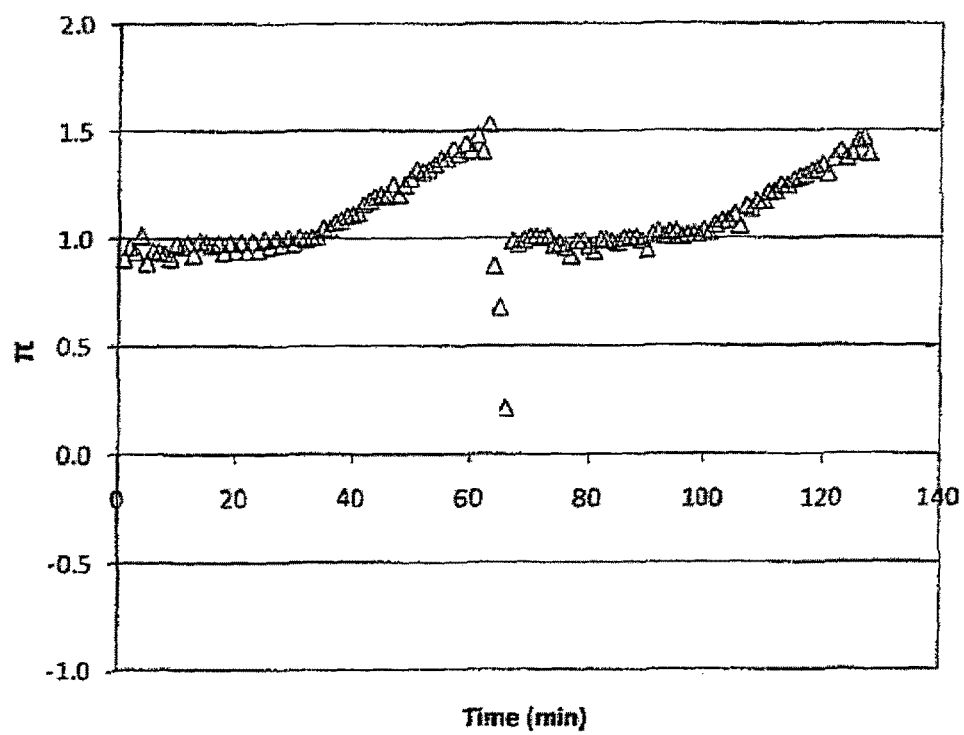
FIG. 12 is a graph of a Π-metric with time with backwash applied at 60 min.

The use of the adjustable resistance regulator 22 in the present invention or membrane sensor 100-1 avoids any fouling in the lower compartment or second chamber 20 of the membrane sensor 100. Hence, this valve or regulator 22 can be opened fully to permit backwashing in order to remove the fouling deposits on or in the membrane 90 in the upper compartment or first chamber 10, or by closing down the valve or regulator 22 and pressurizing the second compartment or second chamber 20. The effectiveness of this backwashing is shown in FIG. 12 that shows a plot of the Π-metric as a function of time for clean water followed by a solution with glass beads at a concentration of 0.05 g/l at 35 minutes. At a time of 60 minutes the feed stream to the present invention was terminated and backwashing was begun by flowing pure water through the fully opened adjustable resistance and subsequently through the fouled membrane. FIG. 12 shows that the Π-metric was restored to the initial value of Π=1. The experiment was repeated with clean water and followed by a solution with glass beads at a concentration of 0.05 g/l at 100-1 minutes. The behavior of the Π-metric before and after backwash were similar.

Figure 13:
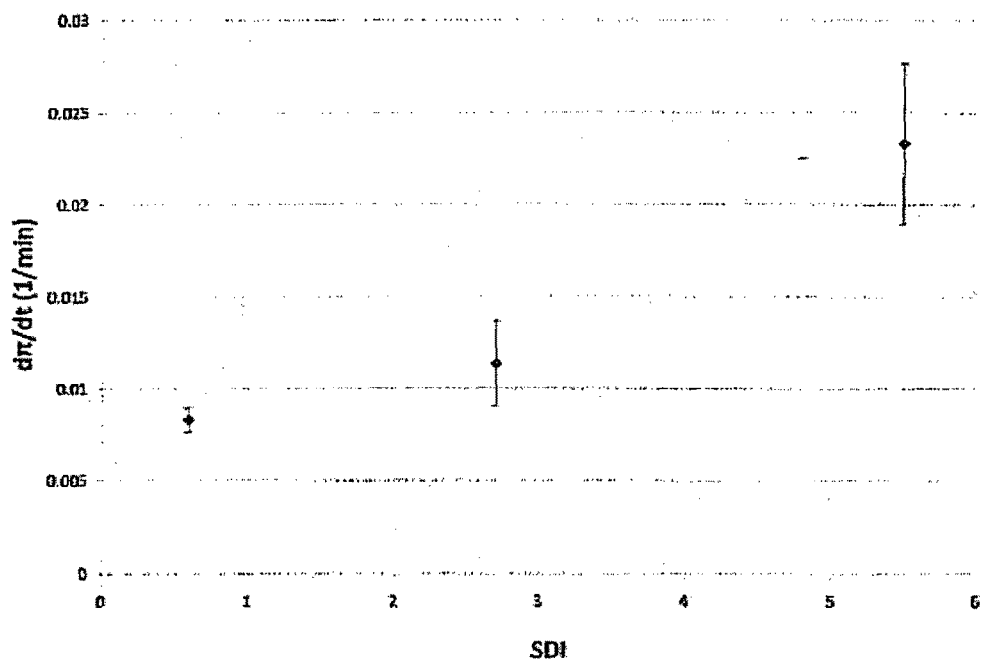
FIG. 13 is a graph of a Π-metric with time as a function of SDI.
Figure 14:
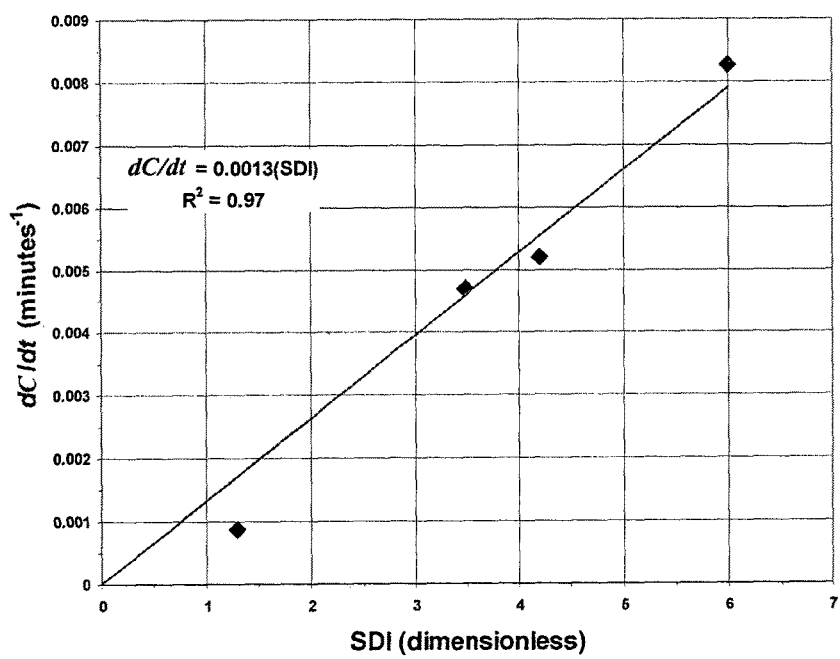
FIG. 14 is a graph of a correlation plot.

The initial slope of the Π-metric for the data shown in FIGS. 8 and 9 is plotted as a function of SDI in FIG. 13. A correlation plot such as that shown in FIG. 14 permits assessing when the time-rate-of-change of the Π-metric determined from the measured pressures and/or pressure differentials in the present membrane sensor 100-1 indicates that the feed stream to the membrane sensor 100-1 has a fouling potential that could be detrimental to subsequent downstream processing equipment, such as spiral-wound or hollow fiber membrane modules, as indicated by recommended maximum values of the SDI or other measures of fouling potential.

Figure 15:
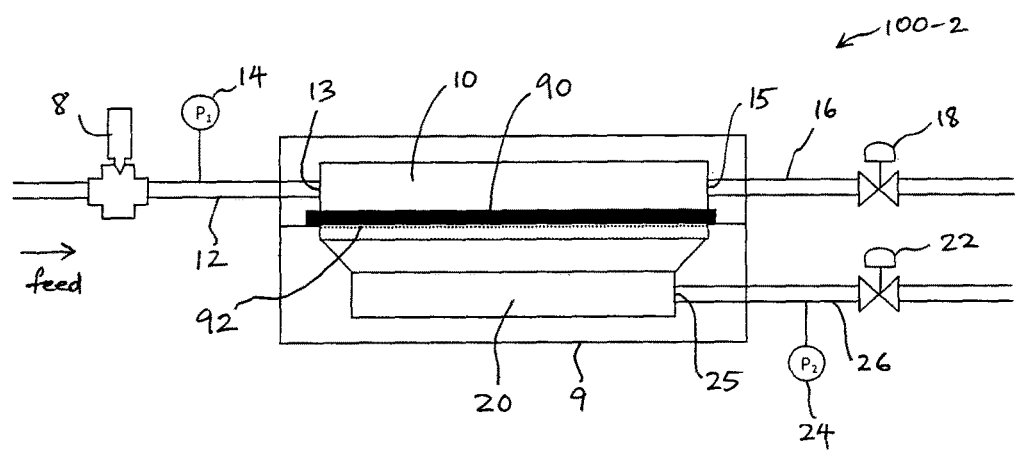
FIG. 15 is another exemplary embodiment of a membrane sensor.

FIG. 15 shows another exemplary embodiment of the membrane sensor 100-2. In this embodiment 100-2, similarly, feed from an upstream source is channeled, through a pressure regulator 8, to the top or first chamber 10 of the sensor 100-2. The pressure regulator 8 eliminates all excessive upstream pressures (due to backwashing) and smoothens the feed pressure $P_1$. In the membrane sensor 100-2, the feed skims over the membrane 90 and is directed to the drain port or outlet 15 of the first chamber 10 by a series of parallel vanes (not shown). Flow in the top drain line 16 is controlled by a backpressure regulator or regulating valve 18. The backpressure regulator 18 allows adjustment of $P_1$. In use, some feed permeates the membrane 90 into the bottom or second chamber 20, 202. The membrane 90 is preferably supported by a 100 μm porous plate 92 which allows permeating throughout the membrane surface. Flow in the bottom or second drain line 26 is controlled by the resistance regulator 22, which may be a regulating valve, allowing for adjustment of the second pressure $P_2$.

However, unlike the embodiment 100-1 shown in FIG. 1, the pressure transducers or transducers 14, 24 of the embodiment 100-2 shown in FIG. 15 are connected to the feed and drain lines 12, 26 respectively outside the membrane sensor 100-2, instead of directly to the sensor body 9 or flow cell 9 comprising the two chambers 10, 20. As can be seen, the first pressure transducer 14 is connected to the feed line or inflow conduit 12 that feeds fluid into the first chamber 10 via the inlet 13 of the first chamber 10. The first pressure transducer 14 is thus disposed upstream of the inlet 13 of the first chamber 10. The second pressure transducer 24 is disposed downstream of the outlet 25 of the second chamber 20. This reduces the total number of ports provided on the membrane sensor 100-2 to only three ports: inlet 13 and outlet 15 of the first chamber 10, and outlet 25 of the second chamber 20. The resulting membrane sensor 100-2 shown in FIG. 15 thus has the parameter or ratio being given as $\Pi=(P_1-P_2)/(P_2)$, 210, since the second drain line 26 is open to the atmosphere, which effectively sets $P_3$ to 0 compared with parameter or ratio $\Pi$ of the membrane sensor 100-1 shown in FIG. 1. Accordingly, no third pressure transducer is required for obtaining readings for $P_3$.

Trapped air is known to reduce effective surface area of membrane sensors; however no air is trapped in the chambers 10, 20 of the membrane sensor 100-2 of the embodiment shown in FIG. 15 as air in both chambers 10, 20 is automatically vented through open top or first and bottom or second drain lines 16, 26 respectively. By contrast, air bubbles can be trapped in the middle chamber sealed between the two membranes of prior art detection apparatus, which require a dedicated purge line to remove the trapped air bubbles, leading to higher costs and more parts for maintenance as well as reducing effective surface area of the membranes.

In use, a fluid such as affluent from an upstream membrane filtration apparatus is fed into the membrane sensor 100-2 and permeated 202 through the membrane 90 from the first chamber 10 to the second chamber 20. The first pressure $P_1$ is obtained upstream of the membrane 90, 204 using the first pressure transducer 14. The second pressure $P_2$ downstream of the membrane 90 is adjusted by setting a resistance of the resistance regulator 22 equal to a resistance of the membrane 90, 206 when the membrane 90 is new. The second pressure $P_2$ is obtained using the second pressure transducer 24, 208. The ratio between $(P_1-P_2)$ and $(P_2)$ is determined 210 to ascertain whether the feed fluid has been fouled, that is, whether the membrane filtration apparatus upstream of the membrane sensor 100-2 is no longer in good working condition.

Figure 16:
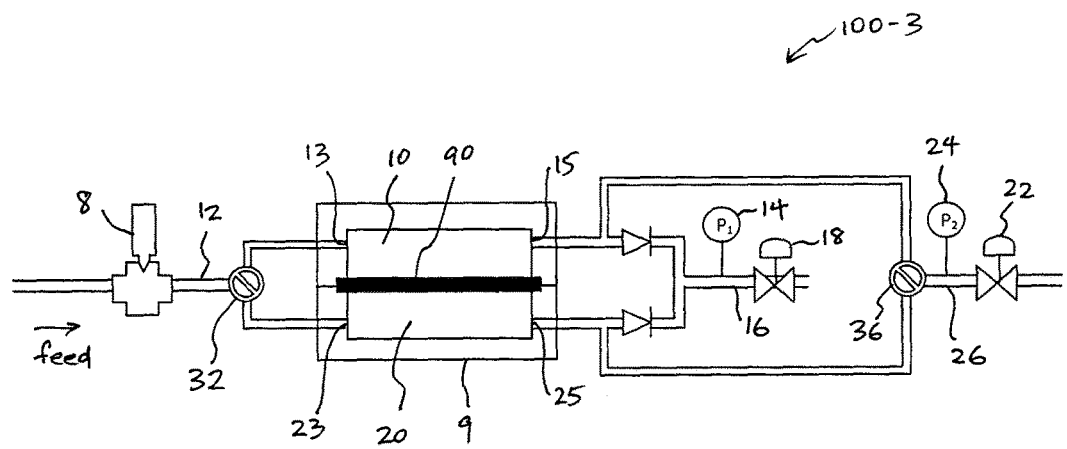
FIG. 16 is a further exemplary embodiment of a membrane sensor.

FIG. 16 shows a further embodiment of the membrane sensor 100-3, being a bidirectional flow sensor 100-3. A series of parallel vanes (not shown) instead of a 100 μm porous plate as shown in the embodiment of FIG. 15 are provided to support the membrane 90. Both the top and bottom or first and second chambers 10, 20 are preferably symmetrical. At a preset interval, feed from a feed line 12 to the membrane sensor 100-1 is switched over from the top or first chamber 10 to the bottom or second chamber 20 by a 3-way valve 32. Thus, after feed has been entering an inlet port 13 of the first chamber 10, after the preset interval, the feed is switched to enter an inlet port 23 of the second chamber 20 instead. At the same time, a drain line 26 for the permeate that has passed through the membrane 90 is correspondingly switched by another 3-way valve 36 from fluid connection with the outflow port 25 of the second chamber 20 to fluid connection with the outflow port 15 of the top chamber 10. Switching the feed as described above is to allow for backwashing of the membrane 90. When the feed is fed to the top chamber 10, operation of the bidirectional membrane sensor 100-3 shown in FIG. 16 is essentially the same as the unidirectional flow sensor 100-2 shown in FIG. 15, except that the bidirectional membrane sensor 100-3 is additionally configured to allow feed to flow in both directions, i.e., from first chamber 10 to second chamber 20 and vice versa, to facilitate backwashing of the membrane 90.

Figure 17:
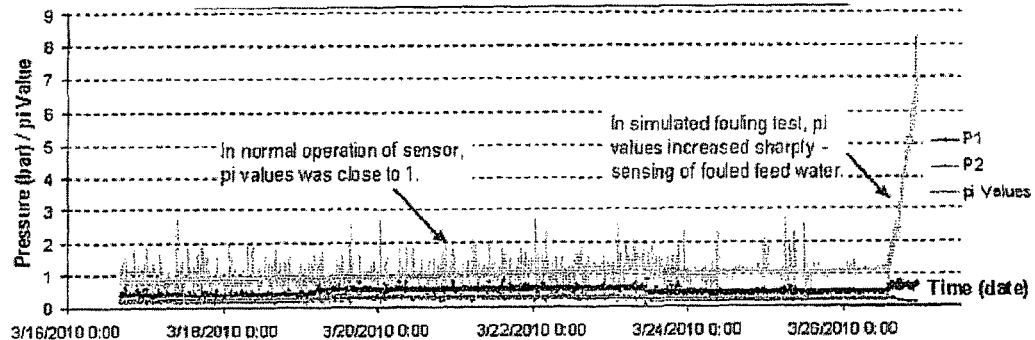
FIG. 17 is a graph of pressure over pi values with time for the membrane sensor of FIG. 15.
Figure 18:
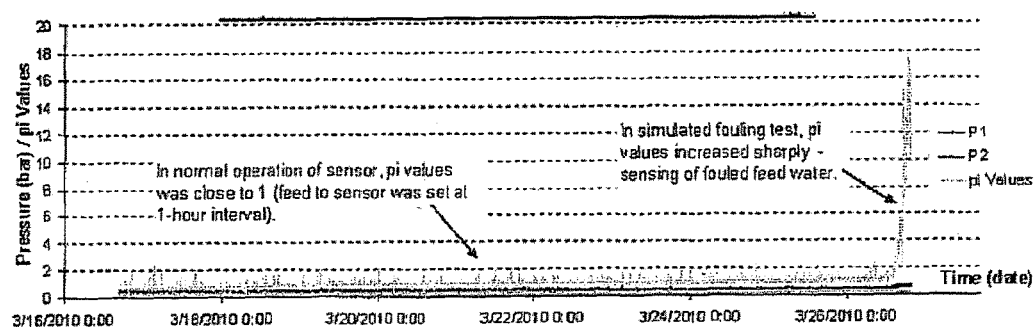
FIG. 18 is a graph of pressure over pi values with time for the membrane sensor of FIG. 16.

As can be seen in the graphs of FIGS. 17 and 18 showing the test results of the membrane sensors 100-2 and 100-3 of FIGS. 15 and 16 respectively, both sensors 100-2, 100-3 were able to show a sharp increase in the $\Pi$ values obtained 210 in fouling simulation tests, indicating sensing of fouled feed water when compared to $\Pi$ values close to 1 during normal operation.

Commercial Applications

The membrane sensor 100 described above can provide an online or real-time method of determining the water quality of UF (ultrafiltration) permeate in a water treatment plant. The membrane sensor 100 can also be used as an integrity sensor for monitoring the health of UF modules in a treatment apparatus in the water treatment plant. Data from the membrane sensor 100 can be used to determine the integrity of the UF modules, as well as be converted into an online SDI reading. While most membranes in UF modules are made to be reasonably robust, defects in potting or tears in the membranes in the UF modules have been known to occur. This compromises the efficiency of the whole plant, and could be especially problematic if an RO (reverse osmosis) train is using the UF permeate as feed.

Figure 19:
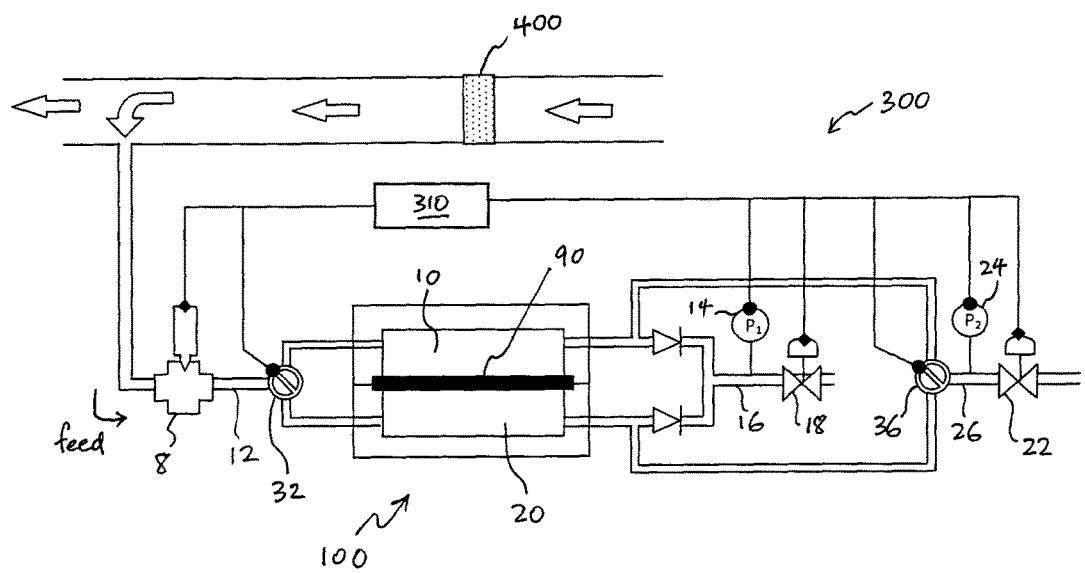
FIG. 19 is an exemplary embodiment of a treatment apparatus comprising the membrane sensor of FIG. 15.

It is envisaged that the water treatment plant comprises a treatment apparatus 300 as shown in FIG. 19, where the membrane sensor 100 is in fluid communication with an upstream membrane filtration apparatus 400. The upstream membrane filtration apparatus 400 comprises one or more UF modules 80, wherein fluid received on the membrane 90 of the membrane sensor 100 is an effluent of the upstream membrane filtration apparatus 400.

The treatment apparatus 300 comprises a control unit 310 configured for receiving the first and second pressures $P_1$ and $P_2$ obtained from the membrane sensor 100, determining a ratio between $(P_1-P_2)$ and $(P_2)$, and correlating the ratio with a failure of the upstream membrane filtration apparatus or a presence of a foulant in the effluent. Where the membrane sensor 100 is a bidirectional membrane sensor 100-3, for example as shown in FIG. 16, the control unit 310 is preferably configured to selectably direct fluid alternately to the first chamber 10 and the second chamber 20 based on a pre-set interval or a pre-set value of the ratio between $(P_1-P_2)$ and $(P_2)$, for example by controlling the three-way valves 32, 36 as shown.

The membrane sensor 100 of the present invention has been shown to be sensitive enough to detect changes in water quality when 0.5% of the fibers in a UF module 80 or train are broken within 30 minutes. This provides a safety net for the water treatment plant. Depending on operator requirements, it would be possible to hook up multiple units of UF modules 80 to one integrity or membrane sensor 100.

Figure 20:
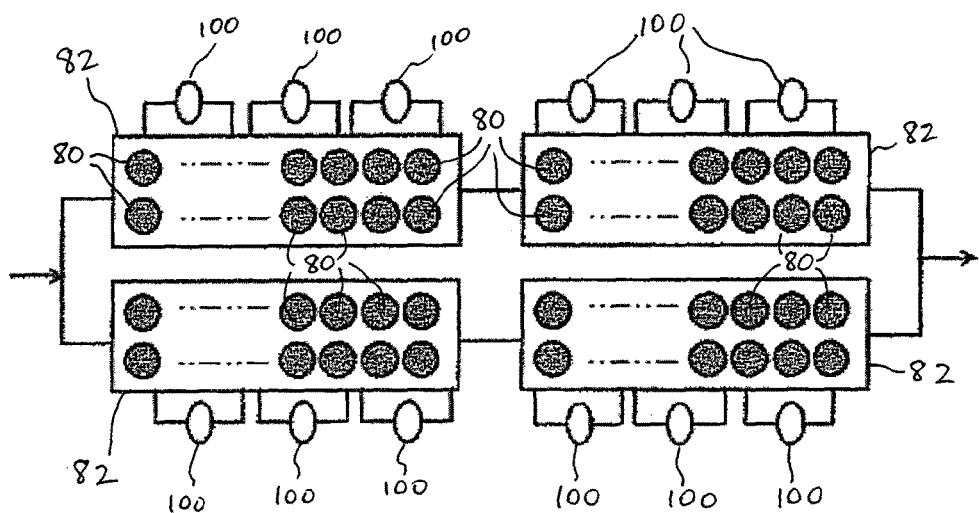
FIG. 20 is a schematic diagram of multiple UF modules forming a plurality of blocks with several membrane sensors installed on each block.
Figure 21:
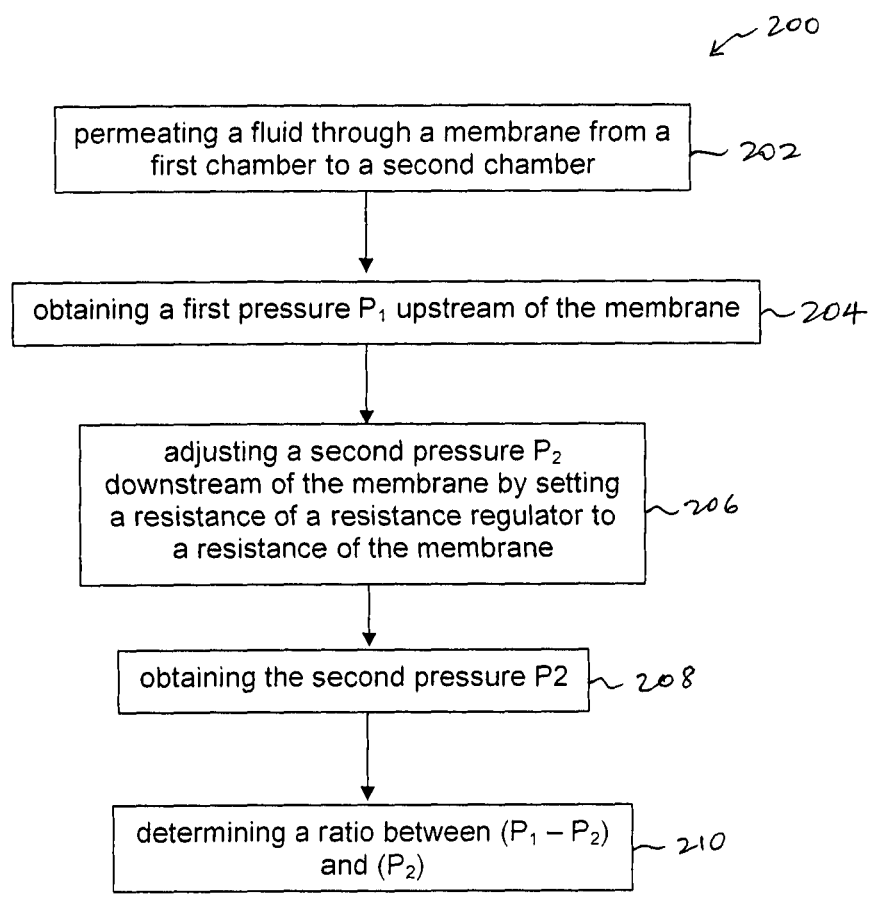
FIG. 21 is a flow diagram of a method of detecting using the membrane sensor of FIG. 15.

Alternatively or in addition, as shown in FIG. 20, multiple UF modules 80 may form a block 82, with several membrane sensors 100 installed on each block 82 of UF modules 80 to determine the integrity of the UF modules 80. For example, each membrane sensor 100 may be configured to monitor the health of twelve to thirty-six UF modules 80 at 10-minute intervals. This means that the health of each UF module 80 will be monitored every one to three hours. A signal to a control room may be set to sound an alarm if breakage is detected for any UF module 80. In this way, an operator can easily identify and isolate the particular UF module 80 for replacement. This improves reliability of the whole system, allowing the operator to identify problematic UF modules 80, as well as increasing the lifespan of the UF modules 80 as the UF modules 80 will only need to be replaced when they have broken. The total cost incurred to install integrity or membrane sensors 100 to monitor the health of the UF modules 80 in blocks as described above is estimated to be between approximately SGD105,000 to SGD200,000.

SDI Measurement

The most commonly used devices in the membrane industries are the SDI Test and the liquid particle counter. The SDI Test is widely used to estimate the rate of particle fouling on membrane surfaces. The SDI Test measures the time taken for a fixed volume of water to pass through a 0.45 μm pore size microfiltration membrane at a constant pressure of 30 psi. Simple equipment are required for the SDI Test; however, it is an off-line sampling test that requires a technician to collect samples at regular intervals.

The liquid particle counter is used to detect and count the number of particles that are presence in feed water. Particle counters have the ability to determine the size and the number of particles. However, due to its high cost, it is usually installed only on a common header. Thus, if a fault is detected, the entire membrane plant may have to be shut down in order to trace the fault. This leads to cost and output inefficiency.

The membrane sensor 100 as described above has the ability to monitor water quality as well as rapidly detect any fluctuation in the quality of the permeate water online. The membrane sensor 100 requires simple monitoring of pressure differences through the membrane sensor 100. Conversely, an SDI sensor can only detect the SDI of water at pre-determined intervals by offline sampling. In comparison, the present membrane sensor 100 can determine the SDI of water on a regular basis (for example, at about 30 minutes intervals) without requiring offline sampling, making it hassle-free.

A simple capital and maintenance cost comparison between an SDI Test, a liquid particle counter and a membrane sensor 100 for a given plant is shown in Table 1 below:

TABLE 1

|  | SDI Test | Liquid Particle Counter | Membrane Sensor 100 |
| --- | --- | --- | --- |
| Cost | $43,800 | $90,000 | $34,000 |
| Savings if replaced by membrane sensor 100 | $ 9,800 | $56,000 | — |
| Notes | No online measurement capability | Potential reliability issues | — |

As can be seen, the membrane sensor 100 of the present invention is significantly more cost effective and efficient, providing real-time measurements compared to using the SDI test or liquid particle counters.

Another significant advantage of the membrane sensor 100 is that it requires only one membrane, thereby halving the maintenance cost of membrane replacement compared to other detection apparatus that require at least two membranes. By removing the need for a second membrane, fouling of the second membrane which has an adverse effect on sensor sensitivity is also eliminated.

Whilst there has been described in the foregoing description preferred embodiments of the present invention, it will be understood by those skilled in the technology concerned that many variations or modifications in details of design or construction may be made without departing from the present invention.

The invention claimed is:

1. A membrane sensor for detecting fouling, the membrane sensor comprising:
   a first chamber, having an inlet and an outlet, the inlet disposed in fluid communication with an upstream membrane filtration apparatus for receiving an effluent fluid therefrom and the outlet providing an outflow from the first chamber;
   a second chamber having an outlet for permitting outflow of permeate from the second chamber;
   only one membrane being disposed between the first chamber and the second chamber for allowing fluid to permeate the membrane from the first chamber to the second chamber, wherein fluid received on the membrane of the membrane sensor is the effluent of the upstream membrane filtration apparatus;
   a first pressure transducer configured for obtaining a first pressure upstream of the membrane;
   a second pressure transducer configured for obtaining a second pressure downstream of the membrane;
   an adjustable resistance regulator provided downstream of the second chamber and configured for adjusting the second pressure; and
   a control unit configured for:
      receiving the obtained first and second pressures; and
      determining presence of foulant in the effluent fluid and thereby a failure of the upstream membrane filtration apparatus by determining a ratio between (P1−P2) and (P2), wherein P1 is the first pressure and P2 is the second pressure.

2. The membrane sensor of claim 1, wherein the adjustable resistance regulator comprises at least one adjustable valve.

3. The membrane sensor of claim 1, wherein the adjustable resistance regulator comprises at least one capillary tube with an adjustable orifice.

4. The membrane sensor of claim 1, further comprising a third pressure transducer configured for obtaining a third pressure downstream of the adjustable resistance regulator.

5. The membrane sensor of claim 1, wherein the second pressure transducer is disposed downstream of the outlet of the second chamber and upstream of the adjustable resistance regulator.

6. The membrane sensor of claim 1, wherein the first chamber is configured to allow some fluid received at the inlet of the first chamber to flow over the membrane to the outlet of the first chamber.

7. The membrane sensor of claim 1, wherein the first pressure transducer is disposed upstream of the inlet of the first chamber.

8. The membrane sensor of claim 1, wherein the membrane sensor is configured to allow reverse fluid flow in the membrane sensor for fluid to permeate the membrane from the second chamber to the first chamber.

9. The membrane sensor of claim 8, wherein the first pressure transducer is disposed downstream of the outlet of the first chamber.

10. The membrane sensor of claim 8, wherein the first pressure transducer is disposed downstream of the outlet of the second chamber.

11. The membrane sensor of claim 8, wherein the second chamber further has an inlet and the second chamber is configured to allow some fluid received at the inlet of the second chamber to flow over the membrane to the outlet of the second chamber.

12. The membrane sensor of claim 11, further comprising a control valve for directing fluid selectably to the inlet of the first chamber or to the inlet of the second chamber.

13. The membrane sensor of claim 1, wherein the membrane is disposed on a plane substantially parallel to a fluid path between the first inlet and the first outlet of the first chamber.

14. The membrane sensor of claim 1, further comprising a backpressure regulator configured for adjusting the first pressure, the backpressure regulator being disposed downstream of the outlet of the first chamber and downstream of the first pressure transducer.

15. The membrane sensor of claim 1, wherein the membrane is supported by a porous plate.

16. The membrane sensor of claim 1, further comprising a plurality of parallel vanes configured for directing fluid from the inlet of the first chamber to the outlet of the first chamber.

17. A treatment apparatus comprising the membrane sensor of claim 3, wherein the control unit is further configured to selectably direct fluid alternately to the first chamber and the second chamber based on a pre-set interval or a pre-set value of the ratio between (P1−P2) and (P2).

* * * * *